United States Patent [19]

Sakai

[11] Patent Number: 6,076,103
[45] Date of Patent: Jun. 13, 2000

[54] INFORMATION PRESENTATION TERMINAL AND METHOD

[75] Inventor: Hiroshi Sakai, Yokohama, Japan

[73] Assignee: Kabushiki Kaisha Toshiba, Kawasaki, Japan

[21] Appl. No.: 08/989,391

[22] Filed: Dec. 12, 1997

[30] Foreign Application Priority Data

Dec. 16, 1996 [JP] Japan ................................... 8-335554

[51] Int. Cl.⁷ .................................................. G06F 15/16
[52] U.S. Cl. .......................................... 709/217; 709/246
[58] Field of Search .................................. 709/217, 219, 709/246, 245, 238; 707/3, 203, 102, 204, 512, 514, 540; 711/162, 161

[56] References Cited

U.S. PATENT DOCUMENTS

| 5,434,974 | 7/1995 | Loucks et al. ........................... 395/200 |
| 5,437,029 | 7/1995 | Sinha ....................................... 395/600 |
| 5,634,052 | 5/1997 | Morris ..................................... 395/601 |
| 5,715,395 | 2/1998 | Brabson et al. .................... 395/200.13 |
| 5,720,026 | 2/1998 | Uemura et al. ............................... 714/6 |
| 5,752,039 | 5/1998 | Tanimura ................................. 707/203 |
| 5,781,773 | 7/1998 | Vanderpool et al. .................... 395/611 |
| 5,784,646 | 7/1998 | Sawada ................................... 395/858 |
| 5,806,065 | 9/1998 | Lomet ......................................... 707/8 |
| 5,813,007 | 9/1998 | Nielsen .................................... 707/10 |
| 5,832,499 | 11/1998 | Gustman ................................. 707/103 |
| 5,832,520 | 11/1998 | Miller ..................................... 707/203 |
| 5,905,866 | 5/1999 | Nakabayashi et al. ................. 709/223 |

*Primary Examiner*—Mehmet B. Geckil
*Attorney, Agent, or Firm*—Finnegan, Henderson, Farabow, Garrett & Dunner, L.L.P.

[57] ABSTRACT

An information presentation terminal which is connected to a server storing electronic data via a network to present electronic data stored in the server is characterized by including a CD-ROM on which at least part of the electronic data stored in the server is recorded, and a CD-ROM reading unit for the CD-ROM wherein, when designated electronic data exists in the CD-ROM, the designated electronic data is read by the CD-ROM reading unit, or when it does not exist, the designated electronic data is obtained from the server via the network to present the obtained electronic data.

13 Claims, 14 Drawing Sheets

FIG. 3

| URL | CONTENTS OF ELECTRONIC DATA |
|---|---|
| http://www.trvl.co.jp/logo.gif | IMAGE DATA (IMAGE FILE OF GIF FORMAT) OF LOGO MARK OF TRAVEL AGENCY |
| http://www.trvl.co.jp/hotel/xx.gif | GENERAL VIEW PHOTOGRAPHIC DATA OF HOTELxx (IMAGE FILE OF GIF FORMAT) |
| ... | ... |

FIG. 4

| URL | CONTENTS OF ELECTRONIC DATA |
|---|---|
| http://www.trvl.co.jp/hotel/index.html | INCLUDING FIRST PAGE (HOME PAGE) OF TRAVEL AGENCY, SERVICE MENU FOR USER, INFORMATION FROM TRAVEL AGENCY AND TAG DATA OF LOGO MARK OF TRAVEL AGENCY (URL http://www.trvl.co.jp/logo.gif) |
| http://www.trvl.co.jp/index.html | PAGE OF LIST OF MAJOR HOTELS |
| ... | ... |

PLEAS GIVE US YOUR TRAVEL DETAILS

DOMESTIC
OVERSEAS

FIG. 5

◯◯TOUR FOR SAFETY AND RELIABILITY

PLEAS GIVE US YOUR TRAVEL DETAILS

DOMESTIC
OVERSEAS

FIG. 6

INFORMATION PRESENTATION TERMINAL AND METHOD

BACKGROUND OF THE INVENTION

The present invention relates to an information presentation system in which a server for providing electronic data, and an information presentation terminal are connected via a communication means such as Ethernet, ATM, or a telephone line to present information requested by users on the information presentation terminal, an information presentation terminal, an information presentation method in the information presentation terminal, and an information obtaining method of obtaining information to be presented and, more particularly, a system in which a large-capacity storage medium such as a CD-ROM (Compact Disc Read Only Memory) or a DVD-ROM (Digital Video Disc Read Only Memory) is arranged on the information presentation terminal to efficiently search for/present information having a large data amount and capable of being partially updated frequently, such as a goods catalogue, map information, a dictionary, an encyclopedia, or a magazine article.

In recent years, the Internet has remarkably spread, and is particularly used for information acquisition and shopping with a WWW (World Wide Web) browser such as "Netscape Navigator".

In the case of shopping, a customer accesses the home page of a distributor on the Internet to select the genre of desired goods. If the customer looks and likes some goods, the customer performs a purchase procedure.

Goods such as clothing, furniture, and pets should be presented clearly and in detail by vivid color photographs or moving images.

In practice, however, sending a vivid color photograph or a moving image increases the load on the customer such as telephone charges or waiting time, so the image quality has to be sacrificed.

In another system, a goods catalogue, map information, or the like is stored in a relatively-low-cost, large-capacity storage medium such as a CD-ROM, and referred to with a personal computer or the like. The CD-ROM can store about 20,000 color still images (calculated assuming one image data amount of about 30 KB by JPEG and a CD-ROM capacity of about 0.6 GB).

In the case of the mail order system, an electronic catalogue stored in a CD-ROM is delivered to the customer semiannually for example, and the customer refers to the color photographs of goods stored in the electronic catalogue to place orders.

In this method, information is updated only when an electronic catalogue is periodically distributed to prospective customers. For this reason, the dealer must keep the stock as long as the catalogue remains valid. In addition, the price is difficult to change at short notice, posing a problem in terms of cost.

To solve the problems of the above-described two systems, a system using a combination of an electronic catalogue stored in a CD-ROM or the like, and the Internet has recently been introduced.

For example, in the catalogue shopping of clothing, determining the genre of goods the user wants, displaying of the photographs of some goods simultaneously on one window, and presenting more detailed photographs of interested one performed by referring to electronic data stored in a CD-ROM. Confirmation of the stock status, and placing orders are performed between the CD-ROM and the server via the Internet.

As for the hotel reservation, checking the equipment and service contents of several hotels at a prospective lodging place is performed by referring to electronic data stored in a CD-ROM. Checking the vacant room status, and reservation are performed between the CD-ROM and the server via the Internet.

In this manner, in the information presentation system using both the CD-ROM and the Internet, high-quality image data can be quickly displayed, and varying information can be obtained from the server of a mail-order dealer or a reservation agent, and displayed. In this system, the user need not care whether the presented information is read from the CD-ROM or the one received from the server.

The above-described current information presentation system using a combination of a CD-ROM and the Internet can rapidly display high-quality image data and present varying information, compared to the conventional information presentation system using the Internet only and the one using the CD-ROM only.

The current information presentation system, however, still has the following problems.

More specifically, first, electronic data of a CD-ROM is usable to change on the server side. For example, even if color photographs of goods recorded on a CD-ROM are found to be wrong, they cannot be replaced with correct ones unless a new CD-ROM is distributed. Even if the new CD-ROM is distributed, the previous CD-ROM may still be used. Similarly, electronic data on the CD-ROM is difficult to update along with the addition or removal of goods.

Second, only a uniform goods catalogue is provided to all the users. Since a CD-ROM can store about 20,000 color photographs, as described above, needs for a special page accessible from only the customers selected by the dealer may arise. To realize this in the current system, two kinds of CD-ROMs must be prepared for specific customers and for general customers, respectively.

The third problem arises when the information presentation system is used to display, e.g., a map. The information of a map becomes obsolete partially due to opening a new expressway, a one-way traffic regulation, a town name change, or the like. In displaying the map of a desired area, even if its part becomes obsolete, the current system undesirably displays the obsolete map recorded on the CD-ROM.

BRIEF SUMMARY OF THE INVENTION

The present invention has been made in consideration of the above situations, and has its first object to provide an information presentation system in which electronic data is easily managed by a server.

It is the second object of the present invention to provide a flexible information presentation scheme which can cope with needs of different users.

It is the third object of the present invention to quickly present the latest electronic data when part of electronic data recorded on a CD-ROM or the like becomes obsolete.

To achieve the above objects, the present invention is characterized by the following arrangement and method.

(1) According to the present invention, there is provided an information presentation terminal which is connected via communication means to a server storing electronic data and having a function of sending, upon reception of a transmission request including an identification name for specifying electronic data, a response including electronic data corresponding to the identification name, comprising a large-capacity storage medium, such as a CD-ROM or a DVD- ROM, on which the electronic data stored in the server and its identification name are recorded, reading means for the large-capacity storage medium, identification name obtaining means for obtaining an identification name of electronic data to be presented, information obtaining means for obtaining, when the identification name obtained by the identification name obtaining means exists in the large-capacity storage medium, electronic data corresponding to the identification name from the large-capacity storage medium by using the reading means, or when it does not exist, sending a transmission request including the identification name to the server to obtain electronic data corresponding to the identification name, and information presentation means for presenting the electronic data obtained by the information obtaining means.

(2) According to the present invention, there is provided an information presentation system in which a server storing electronic data, and an information presentation terminal for presenting the electronic data stored in the server are connected via communication means, wherein the server has a function of sending, upon reception of a transmission request including an identification name for specifying electronic data, a response including electronic data corresponding to the identification name, and the information presentation terminal comprises a large-capacity storage medium, such as a CD-ROM or a DVD-ROM, on which the electronic data stored in the server and its identification name are recorded, reading means for the large-capacity storage medium, identification name obtaining means for obtaining an identification name of electronic data to be presented, and information obtaining means for obtaining, when the identification name obtained by the identification name obtaining means exists in the large-capacity storage medium, electronic data corresponding to the identification name from the large-capacity storage medium by using the reading means, or when it does not exist, sending a transmission request including the identification name to the server to obtain electronic data corresponding to the identification name.

(3) According to the present invention, there is provided a method of obtaining electronic data corresponding to a given identification name in an information processing unit which is usable in the information processing unit that is connected via communication means to a server storing electronic data and having a function of sending, upon reception of a transmission request including an identification name for specifying electronic data, a response including electronic data corresponding to the identification name, and has a large-capacity storage medium, such as a CD-ROM or a DVD-ROM, on which the electronic data stored in the server and its identification name are recorded, comprising the search step of searching the large-capacity storage medium for the identification name, the information reading step of reading electronic data corresponding to the identification name from the large-capacity storage medium when the search step finds that the identification name exists in the large-capacity storage medium, the information requesting step of sending a transmission request including the identification name to the server when the search step fails, and the response reception step of receiving a response sent from the server in response to the transmission request.

(4) According to the present invention, there is provided an information presentation method for the information presentation terminal which is usable in the information presentation terminal that is connected via communication means to a server storing electronic data and having a function of sending, upon reception of a transmission request including an identification name for specifying electronic data, a response including electronic data corresponding to the identification name, and has a large-capacity storage medium, such as a CD-ROM or a DVD-ROM, on which the electronic data stored in the server and its identification name are recorded, comprising the identification name obtaining step of obtaining an identification name for specifying electronic data to be presented, the search step of searching the large-capacity storage medium for the identification name obtained in the identification name obtaining step, the information reading step of reading electronic data corresponding to the identification name from the large-capacity storage medium when the search step finds that the identification name exists in the large-capacity storage medium, the information requesting step of sending a transmission request including the identification name to the server when the search step fails, the response reception step of receiving a response sent from the server in response to the transmission request, and the information presentation step of presenting electronic data obtained in the information reading step or the response reception step.

According to the present invention, a large-capacity storage medium such as a CD-ROM is loaded on an information presentation terminal side. This large-capacity storage medium is referred to for information desired to be presented. If the desired information exists in the large-capacity storage medium, it is presented; if it does not exist, the desired information is obtained from a server 10. With this operation, most of the latest information of enormous data such as image can be presented to the user at a high speed. The server 10 can detect information references the user makes to the large-capacity storage medium on the information presentation terminal side. Further, the latest version of enormous electronic data can be efficiently obtained chiefly from the large capacity storage medium and partially from the server 10.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a table showing an example of electronic data stored in a large-capacity storage medium according to the first embodiment;

FIG. 4 is a table showing an example of electronic data stored in a server according to the first embodiment;

FIG. 5 is a view showing a display example of electronic data of only characters according to the first embodiment;

FIG. 6 is a view showing a display example of electronic data of characters with a logo according to the first embodiment;

DETAILED DESCRIPTION OF THE INVENTION

Figure 1:
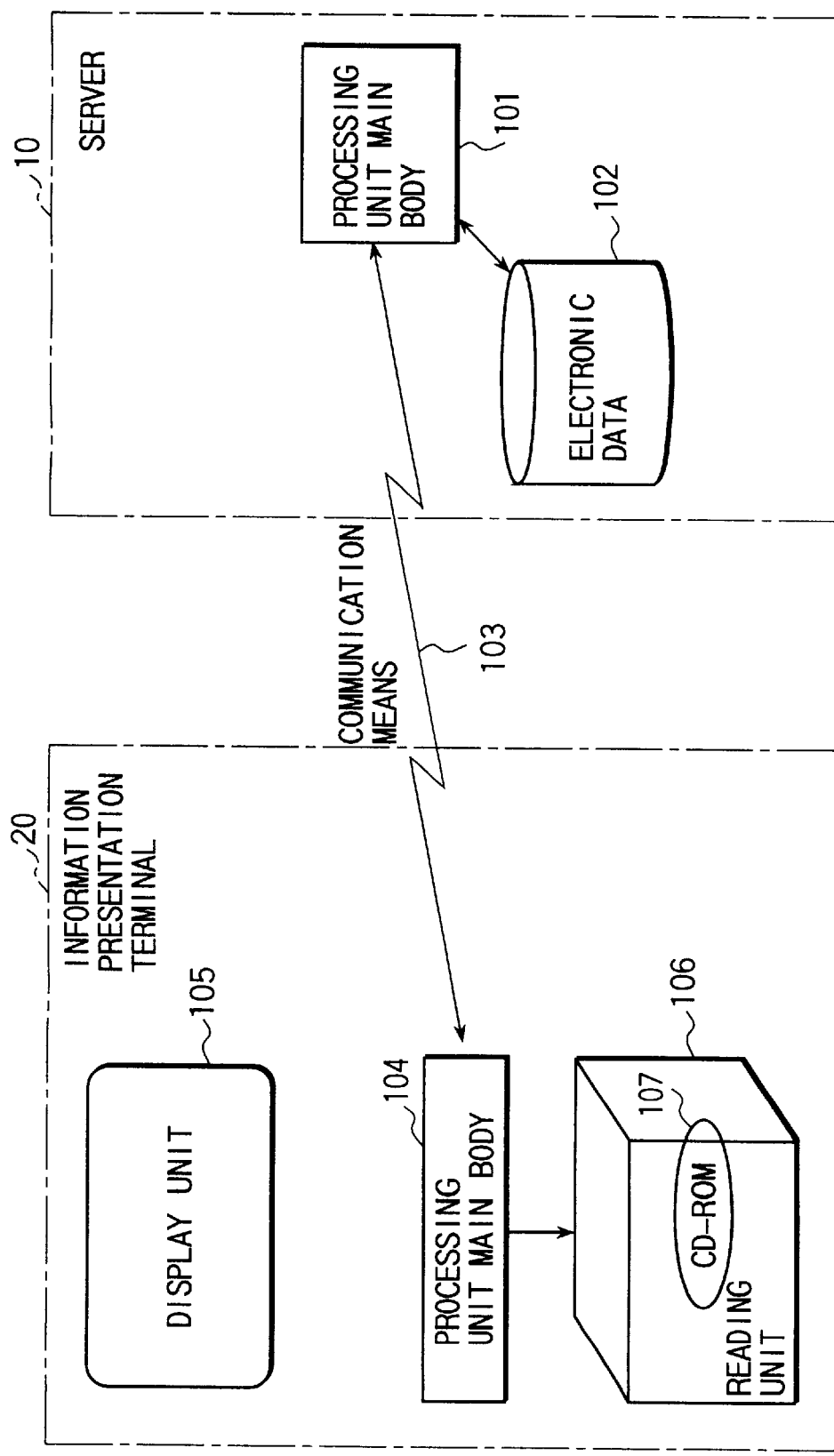
FIG. 1 is a block diagram showing the arrangement of an information presentation system in the first embodiment of the present invention.

An embodiment of the present invention will be described below with reference to the several views of the accompanying drawing.

(First Embodiment)

The first embodiment of the present invention will be described. This embodiment is related to an improvement of WWW (World Wide Web) browser in an information presentation system constituted by a conventional WWW server and a WWW browser. First, the conventional WWW server and the WWW browser will be explained. The WWW server is a computer in which an existing WWW server program (e.g., NCSA http) runs, and the WWW browser is a computer in which an existing WWW browser program (e.g., "Netscape Navigator") runs.

The WWW server holds various information as text files of the HTML (Hyper Text Markup Language) format and image files of the GIF format. In the case of a document including text and an image, the server holds the document as two files, namely a text file of the HTML format (file A) and an image file of the GIF format (file B). The text file of the HTML format includes a tag used to refer to the image file of the GIF format.

This tag includes a character sequence called URL (Uniform Resource Locator) for specifying the second file. In this embodiment, all information represented as a text file of the HTML format or an image file of the GIF format are called electronic data.

The WWW browser sends, to the WWW server, a transmission request including the URL of information which the user wants to see. The URL includes information for specifying the WWW server having the requested information. Therefore, even if a plurality of WWW servers exist, the transmission request can be sent to the desired WWW server.

Assume that a transmission request including a URL of file A is sent to the WWW server.

Upon reception of the transmission request including the URL, the WWW server converts the URL into the pathname of the local file system of the server, reads the contents of a file designated by the pathname, and returns a response including the contents to the WWW browser. In this case, the WWW server returns a response including the contents of file A to the WWW browser.

Upon reception of the response, the WWW browser refers to its header information to identify the type (e.g., text file of the HTML format or image file of the GIF format), and outputs the contents on a display unit in accordance with the type.

In this case, the WWW browser receives the text file of the HTML format, and recognizes that this file includes a tag which includes the URL of file B to the image file of the GIF format.

The WWW browser outputs the contents of file A to the display unit, and sends a transmission request including the URL of file B to the WWW server.

The WWW server reads the contents of file B, and returns a response including the contents to the WWW browser.

Upon reception of the response, the WWW browser refers to its header information, identifies that this file is an image file of the GIF format, and outputs the contents to the display unit.

Generally, image data has a large data amount. In the above case, transmission of file B from the WWW server to the WWW browser requires a longer time.

The arrangement of the first embodiment of the present invention will be described below.

FIG. 1 is a block diagram showing the arrangement of an information presentation system in the first embodiment of the present invention.

A server 10 is identical to the conventional WWW server, and constituted by a processing unit main body 101, and a storage unit 102 such as a hard disk which holds electronic data.

The server 10 and an information presentation terminal 20 (corresponding to the conventional WWW browser) are connected via a communication means 103.

The information presentation terminal 20 is constituted by a processing unit main body 104, a display unit 105, a CD-ROM reading unit 106, a CD-ROM 107, and the like.

The processing unit main body 104 controls the respective portions in the information presentation terminal 20.

The display unit 105 displays electronic data in the CD-ROM 107 which is read by the CD-ROM reading unit 106, and electronic data received from the server 10.

The information presentation terminal 20 can be implemented as a conventional personal computer where a program employing the information presentation method of the present invention. A DVD-ROM and a DVD-ROM reading unit may be used instead of the CD-ROM 107 and the CD-ROM reading unit 106.

In the information presentation terminal 20, e.g., a modem may be attached to a DVD player, and a television may be used as the display unit 105, instead of the computer. In this case, the television and the processor in the DVD player are respectively equivalent to the display unit 105 and the processing unit main body 104. In addition, the information presentation terminal 20 comprises a mouse and a communication means (neither are shown).

Pluralities of information presentation terminals 20 and servers 10 may be connected to the communication means 103, and a given information presentation terminal 20 may access electronic data stored in an arbitrary server 10 to display it. For the sake of simplicity, one information presentation terminal 20 and one server 10 are exemplified.

The CD-ROM loaded on the CD-ROM reading unit 106 holds some pieces of the electronic data of the server 10 and their corresponding URLs (Uniform Resource Locator).

The CD-ROM 107 is assumed to be periodically delivered from a company managing the server 10 to an individual or a company which frequently accesses the server 10 by using the information presentation terminal.

After certain electronic data has been recorded on the CD-ROM 107, if the data is updated within the server, their contents differ from each other. That is, the electronic data corresponding to a certain URL in the CD-ROM 107 may be different from that in the server.

Figure 2:
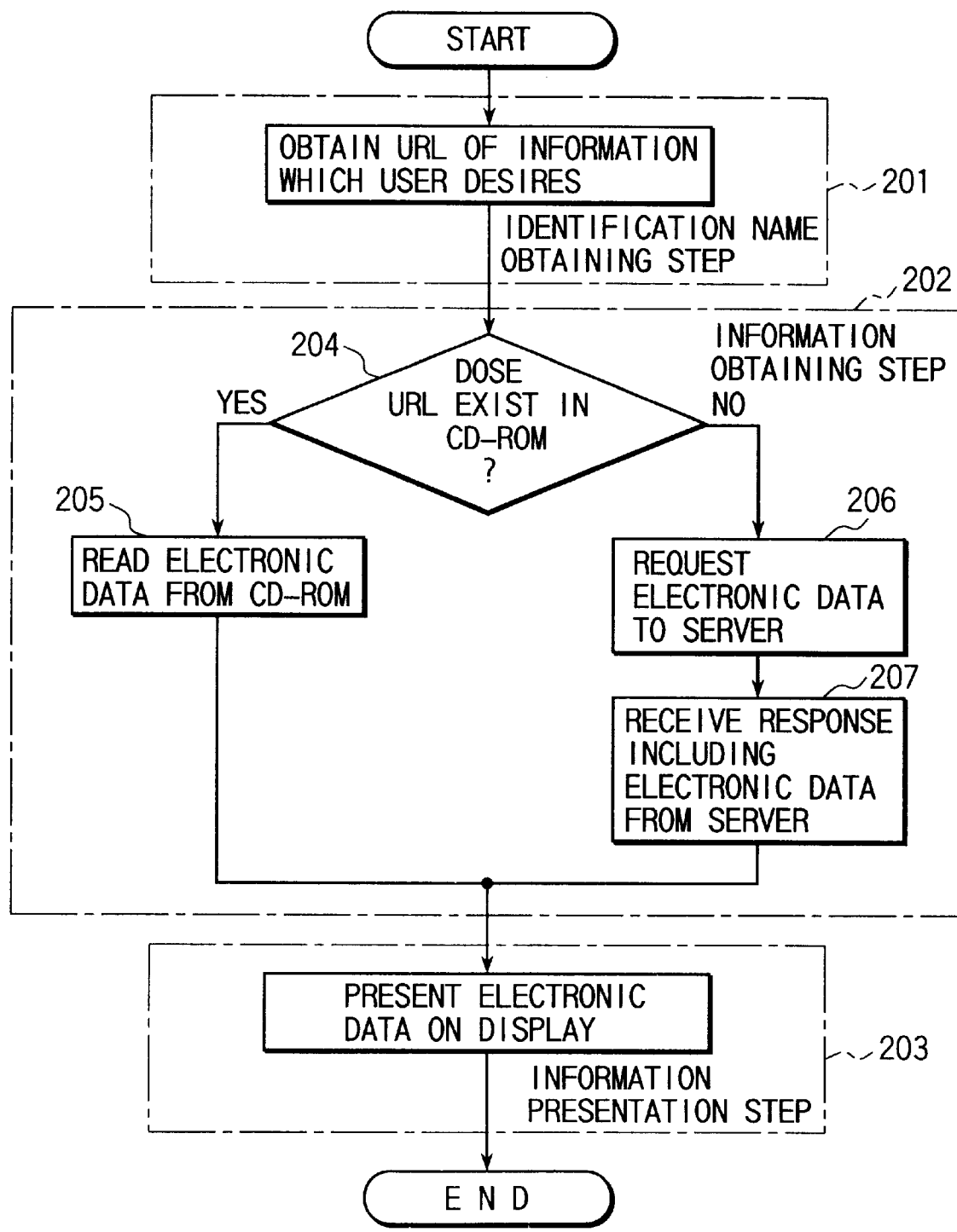
FIG. 2 is a flow chart for explaining the processing procedure of an information presentation terminal in the first embodiment.

The main logic of the information presentation terminal 20 is implemented by a program. As depicted in FIG. 2, this program is constituted by identification name obtaining step 201, information obtaining step 202, information presentation step 203, and the like. The information obtaining step is constituted by search step 204, information read step 205, information request step 206, response reception step 207, and the like. FIG. 2 shows the relationship of the respective steps.

For identification name obtaining step 201, when the user starts using this information presentation terminal, the identification name obtaining step 201 generates a certain name (the name of the home page). In the course of the information retrieval, when the user selects and clicks a one of the objects (words or figures) presented on the display unit and the identification name obtaining step 201 recognize the position and identifies the associated URL and passes it to the information obtaining step 202. Existing WWW browsers equip this kind of identification name obtaining step 201.

For information obtaining step, search step 204 searches the CD-ROM for the URL obtained by the identification name obtaining step 201.

If the URL is found (YES in search step 204), electronic data corresponding to the URL is read from the CD-ROM 107 (information read step 205).

If the URL is not found (NO in search step 204), the information presentation terminal 20 sends a transmission request including the URL to the server 10 (request transmission step 206). The information presentation terminal 20 receives electronic data sent from the server (response reception step 207).

Information obtaining step 202 in this embodiment is different from those of the existing WWW browser in that electronic data in the CD-ROM 107 is read without sending any electronic data transmission request to the server when the URL exists in the CD-ROM 107.

As a result, when the requested URL and the associated electronic data exist in the CD-ROM, the information obtaining step takes only a short time even if the volume of the associated electronic data is large.

In information presentation step 203, the electronic data obtained in the information obtaining step is displayed on the display unit 105 in accordance with its format. The existing WWW browsers also have this kind of information presentation step 203.

The operations of the information presentation terminal 20 and the server 10 will be described with reference to FIGS. 3 through 6.

FIG. 3 shows pairs of URLs stored in the CD-ROM 107 and their electronic data. FIG. 4 shows pairs of URLs and their electronic data held within the server.

The information presentation terminal 20 holds a certain URL which is used at the start of information retrieval. In this case, the URL is assumed to be "http://www.trvl.co.jp/index.html".

The URL obtained in information obtaining step 201 is transferred to information obtaining step 202.

In information obtaining step 202, search step 204 determines the URL does not exist in the CD-ROM 107 (NO in search step 204). The information presentation terminal 20 sends a transmission request including the URL "http://www.trvl.co.jp/index.html" to the server (request transmission step 206).

The server 10 sends a response including electronic data corresponding to the URL to the information presentation terminal 20.

The electronic data includes a menu which allows the user to select necessary information, information from the travel agency, and tag data (including http://www.trvl.co.jp/logo.gif as a URL) for referring to the logo mark (image file of the GIF format) of the travel agency.

In response reception step 207, the information presentation terminal 20 receives a response including the electronic data from the server, and transfers it to information presentation step 203.

In information presentation step 203, the electronic data included in the response is displayed on the display unit 105 (see FIG. 5).

At this time, since the electronic data includes the tag data, the URL "http://www.trvl.co.jp/logo.gif" in the tag data is transferred to information obtaining step 202.

In information obtaining step 202, search step 204 determines that the URL exists in the CD-ROM 107 (YES in search step 204). Information read step 205 reads the corresponding image file of the GIF format from the CD-ROM 107, and transfers it to information presentation step 203.

In information presentation step 203, the image file of the GIF format is displayed on the display unit 105 (see FIG. 6).

Since the image file of the GIF format is read from the CD-ROM 107, information can be presented at a higher speed than in a conventional WWW browser.

Since the text file of the HTML format corresponding to the URL "http://www.trvl.co.jp/index.html" is held by only the server 10 (without being recorded on the CD-ROM 107), and properly updated, the latest information can be displayed on the information presentation terminal 20.

If tag data for referring to an image file of the GIF format is deleted from a text file of the HTML format, or is changed into tag data for referring to another image file of the GIF format, a seasonal image can be displayed on the information presentation terminal 20.

In general, the user sequentially looks a plurality of electronic data in accordance with the user's interest. Therefore, if key URLs and their electronic data are held by only the server 10 without being recorded on the CD-ROM 107, the usage of electronic data by the information presentation terminal 20 can be easily detected on the server 10 side.

The server 10 has advantages that the conventional WWW server can be used without any modification, and that the user not having any CD-ROM 107 can receive just the same information as that for the user having the CD-ROM 107 though the information presentation speed is poor. A method of providing special information to only the user having the CD-ROM 107 will be described in another embodiment.

In the first embodiment, the operation has been described by exemplifying the first page of sightseeing information.

The same effect can be expected in another application. In the case of a music CD catalogue, the image of the jacket of a music CD of standard numbers, and the beginning (part) of its melody are stored in the CD-ROM 107, while information about a newly released CD or a music CD in a low-access-frequency genre is provided from the server.

The user can receive presentation of information without being conscious of whether the information exists in the CD-ROM 107 or the server.

To summarize the effects of this embodiment, a large amount of electronic data, typically an image file, can be presented at a much higher speed than the case using the conventional WWW server and WWW browser. Compared to the current information presentation system using both the internet and a CD-ROM, the server easily changes the contents and easily obtains the usage of the CD-ROM.

(Second Embodiment)

In a WWW browser program called "Netscape Navigator", information received from the WWW server is stored temporarily in a buffer area a main memory and/or a magnetic disk unit within. In the second and subsequent accesses, the information stored in this buffer area is used to accelerate information presentation.

An example of a method of further increasing the information presentation speed in the information presentation terminal and method of the first embodiment by using both such a buffer area and the CD-ROM will be described as the second embodiment of the present invention.

Figure 7:
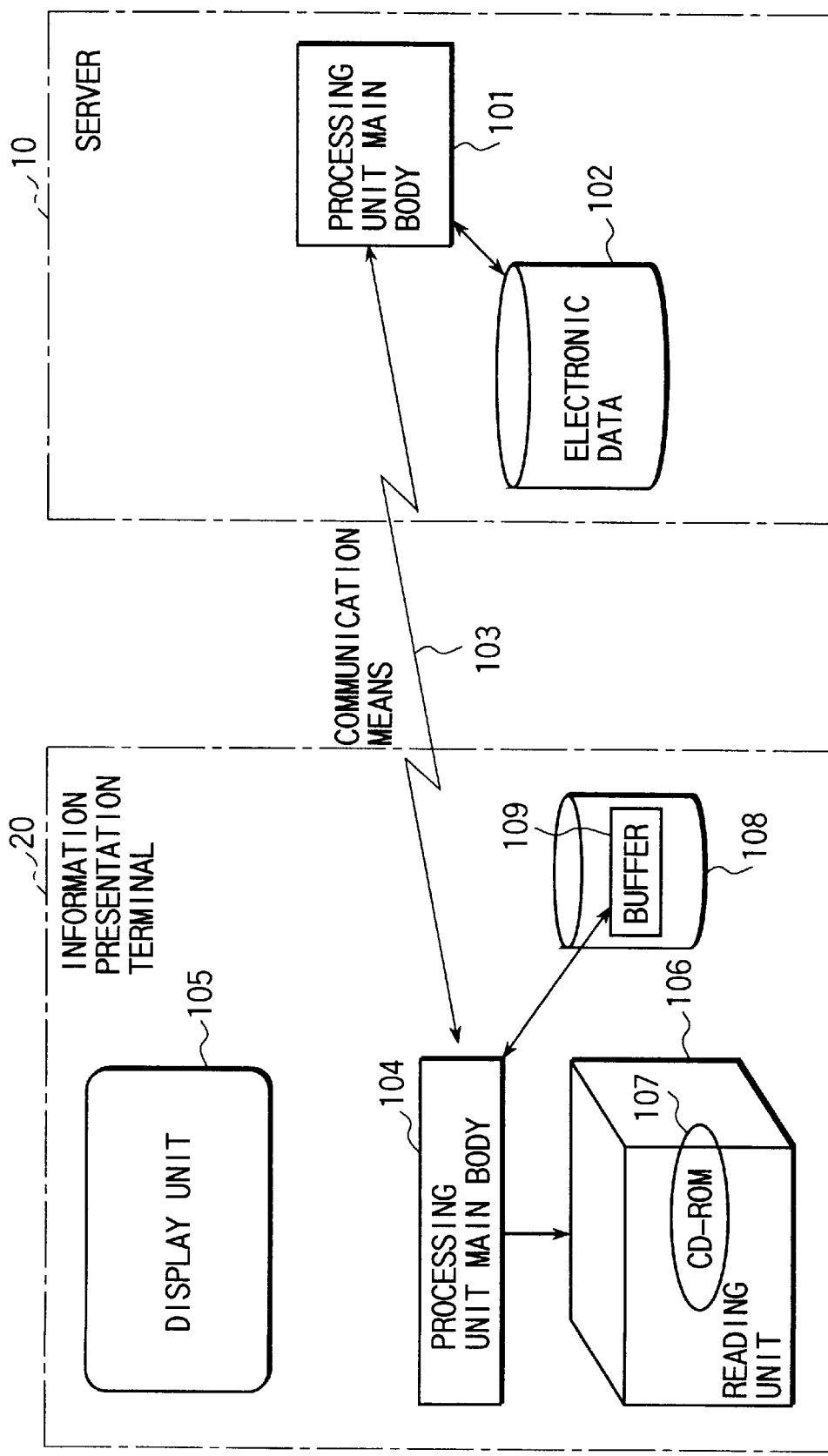
FIG. 7 is a block diagram showing the arrangement of an information presentation system according to the second embodiment of the present invention.

FIG. 7 shows the arrangement of an information presentation terminal. The second embodiment is different from the first embodiment only in that a buffer is allocated in a magnetic disk unit.

In the buffer area allocated in the magnetic disk, pairs of individual electronic data and their URLs are stored.

Figure 8:
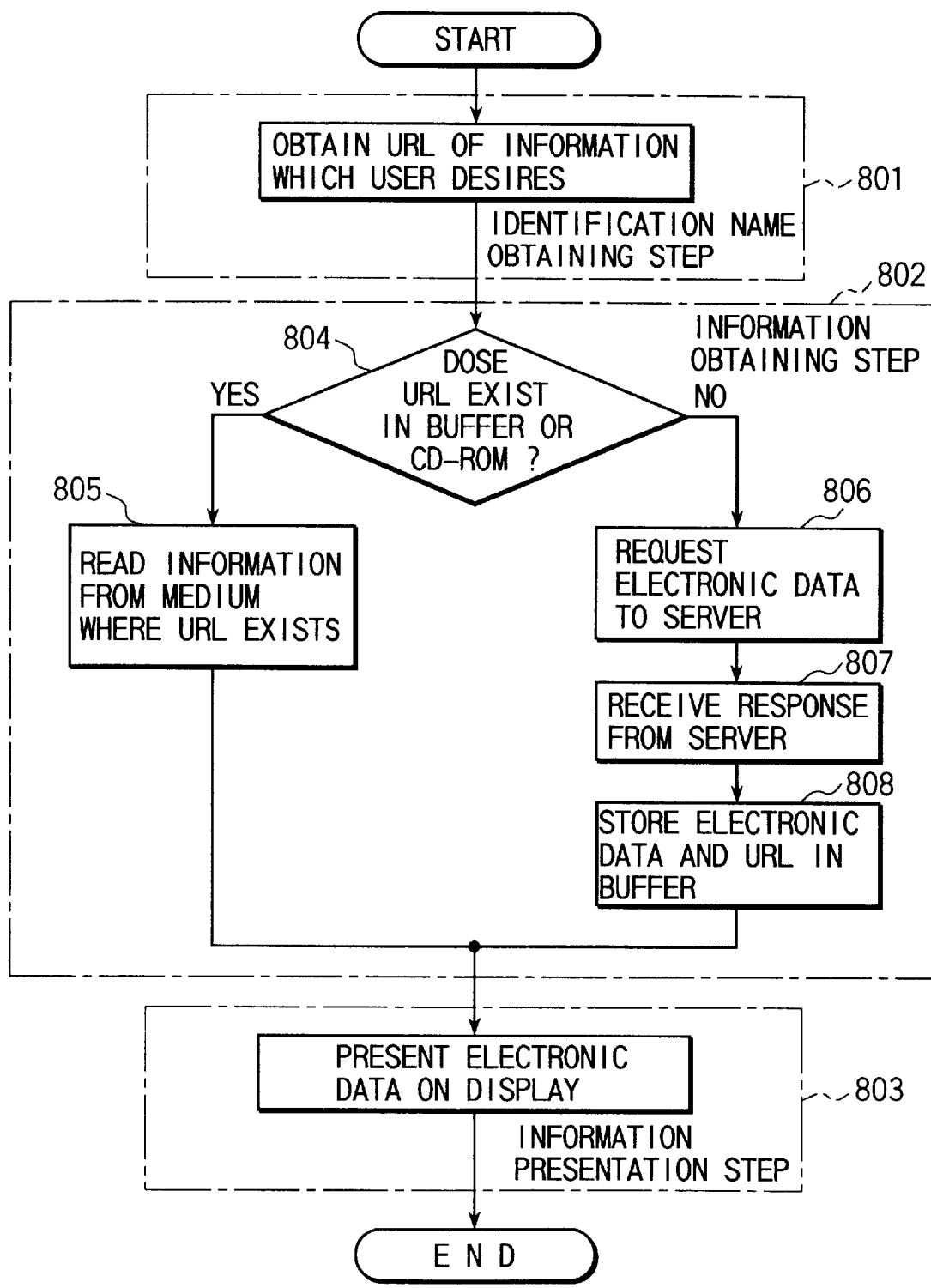
FIG. 8 is a flow chart for explaining the processing procedure of an information presentation terminal according to the second embodiment.

The main logic of an information presentation terminal 20 in the second embodiment is implemented by a program. As shown in FIG. 8, this program is constituted by identification name obtaining step 801, information obtaining step 802, information presentation step 803, and the like.

The information obtaining step is constituted by search step 804, information read step 805, request transmission step 806, response reception step 807, information storage step 808, and the like. FIG. 8 shows the relationship between the respective steps.

In information obtaining step 802, search step 804 searches the buffer and a CD-ROM 107 for a URL obtained in identification name obtaining step 801. These media are searched sequentially from either of the two or simultaneously.

If the URL is found (YES in search step 804), electronic data corresponding to the URL is read from the storage medium in which the URL is found (information read step 805).

If the URL is not found (NO in search step 804), the information presentation terminal 20 sends a transmission request including the URL to a server 10 (request transmission step 806).

The information presentation terminal 20 receives a response including electronic data which is sent from the server 10 (response reception step 807), and stores a pair of URL and received electronic data in the buffer (information storage step 808).

By keeping a copy of URLs stored in the CD-ROM and the buffer within a fast accessible device like the main memory, the search step is accelerated considerably.

When the URL exists in the buffer, the operation information obtaining step 802 of this embodiment is the same as that of the information obtaining step of an existing WWW browser. However, this embodiment is advantageous because no electronic data transmission request to the server 10 is needed when the URL exists in the CD-ROM 107.

The CD-ROM 107 and the buffer have the same effect because they hold part of electronic data stored in the server 10 to reduce the electronic data transmission delay between the server 10 and the information presentation terminal.

The difference between the CD-ROM 107 and the buffer will be described.

The buffer is advantageous in that, regardless of electronic data accessed by the user, the speed of a subsequent access to the electronic data can be increased by storing the electronic data in the buffer.

That is, access frequency of electronic data need not be estimated in advance. A high access speed can be realized for the user who tends to repeatedly request presentation of the same electronic data.

On the other hand, the CD-ROM 107 has an advantage at electronic data recorded on the CD-ROM 107 can be accessed at a high speed from the first access, and an economical advantage.

The economical advantage will be explained in detail. Normally, a CD-ROM 107 is delivered from its dealer to the user. When the user refers to information provided by, e.g., a mail-order dealer A, the user mounts a CD-ROM 107 received from the mail-order dealer A in a CD-ROM reading unit 106 to start presenting information. When reference of the information provided by the mail-order dealer A is finished, the user dismounts the CD-ROM 107 from the CD-ROM reading unit 106.

The cost of use of the CD-ROM 107 can be considered to be equal to the manufacturing cost of almost one CD-ROM, which is about one dollar for a capacity of about 600 MB.

To the contrary, in a magnetic disk unit generally used as a buffer, the buffer remains even upon completion of reference of the information provided by the mail-order dealer A. Therefore, the cost of the buffer is equal to the cost of the magnetic disk unit, which is fifty dollars for a capacity of about 600 MB.

For a DVD-ROM, the capacity is several times bigger than a CD-ROM while the manufacturing cost is almost equal to that of the CD-ROM. Therefore, economical advantage is much larger.

Since the CD-ROM 107 and the buffer have the above-described difference, using both the CD-ROM 107 and the buffer has an combining merit as described in the second embodiment.

(Third Embodiment)

The first and second embodiments still have room for improvement because, even if electronic data recorded on the CD-ROM 107 is updated in the server 10, the information presentation terminal 20 cannot obtain the latest electronic data from the server 10.

"Netscape Navigator" (WWW browser) using a buffer cooperates with the server 10 to solve this problem (refer to, "OPEN DESIGN", No. 13 HTML Reference, CQ Publication, April, 1996, Section 2, Hyper Text Transfer Protocol (HTTP)).

Figure 16:
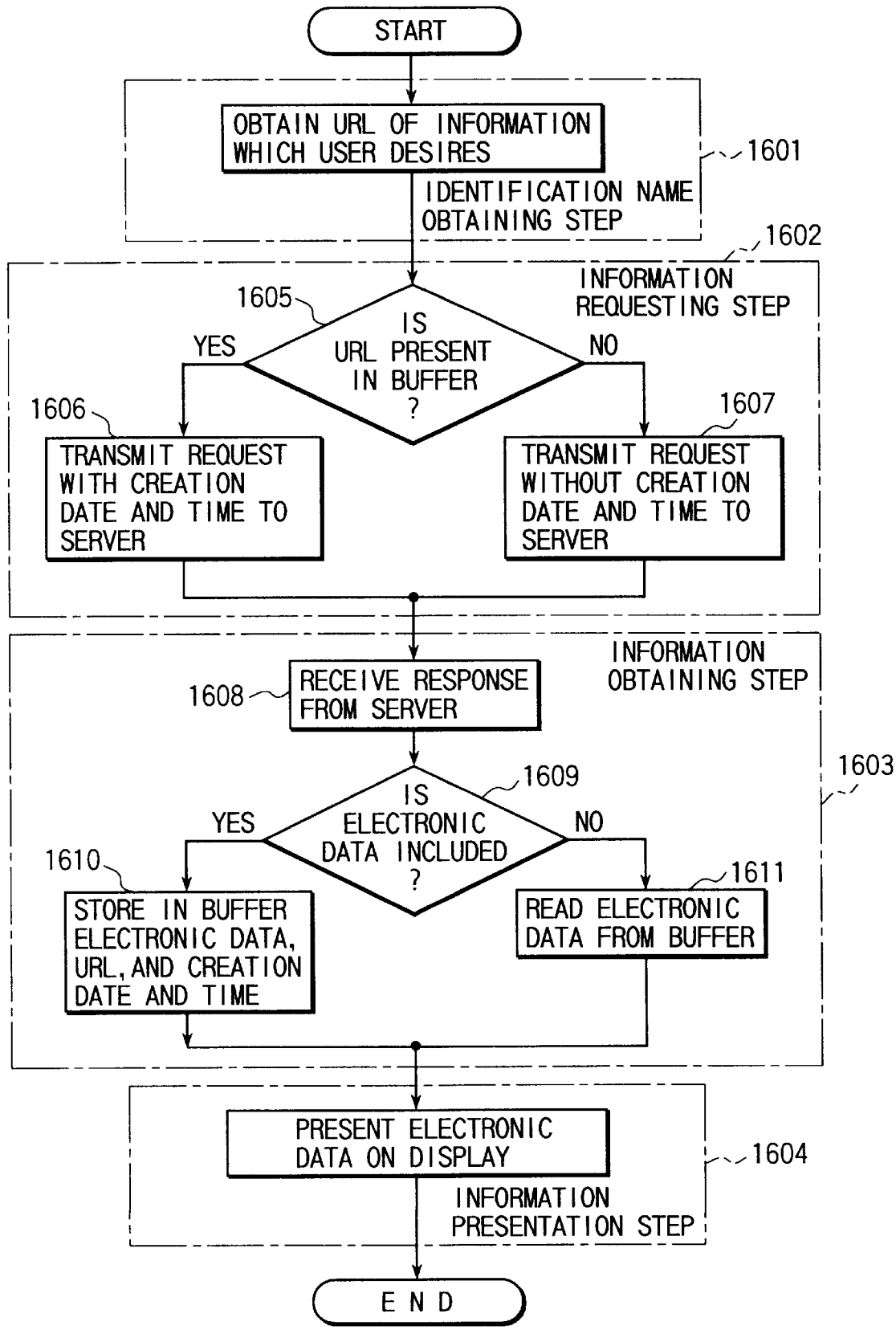
FIG. 16 is a flow chart showing the processing procedure of an information presentation method using a conventional buffer.
Figure 17:
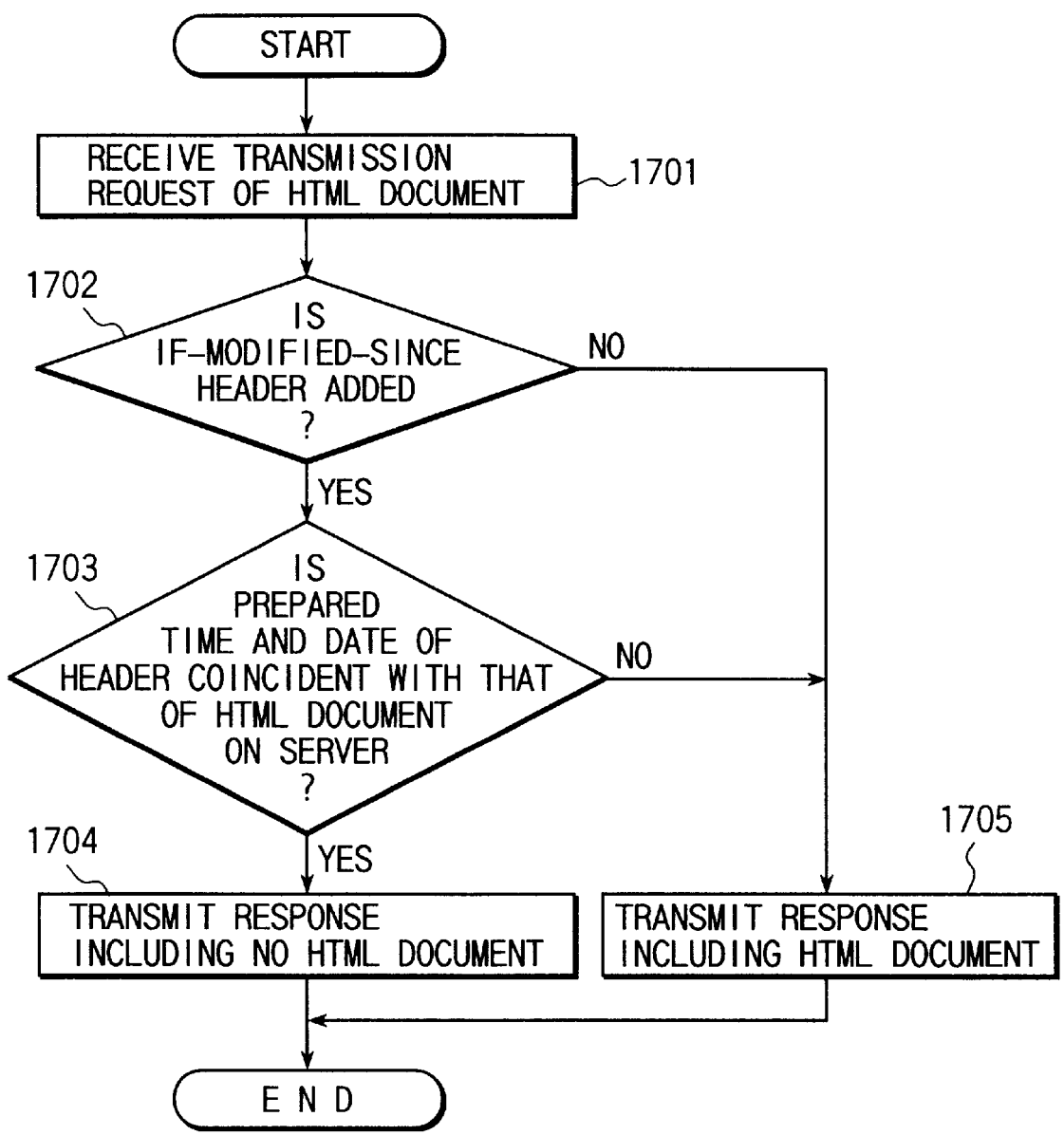
FIG. 17 is a flow chart showing the processing procedure of a conventional server.

This method will be described below. FIG. 16 shows the operation of the existing WWW browser, and FIG. 17 shows the operation of a server 10.

An If-Modified-Since header can be included in the request header of a transmission request for electronic data which is sent from the WWW browser to the server 10.

In the WWW browser, electronic data, its URL, and its creating date and time are stored in the buffer.

The WWW browser obtains the URL of electronic data which the user desires to be presented (identification name obtaining step 1601), and searches for the designated URL. If the URL is found (YES in search step 1605), the WWW browser sends, to the server 10, a transmission request in which the creating date and time stored in the buffer are added to the If-Modified-Since header (request transmission step 1606).

The server 10 receives the transmission request (request reception step 1701). If the transmission request includes an If-Modified-Since header (YES in request determination step 1702), the creating date and time within the If-Modified-Since header are compared with the creating date and time of the electronic data held by the server 10 to determine whether the electronic data held on the WWW browser side is the latest. If the electronic data is the latest (YES in latest determination step 1703), the server 10 transmits a response including no electronic data (first response transmission step 1704); if it is not the latest (NO in latest determination step 1703), the server 10 transmits a response including the electronic data held thereby (second response transmission step 1705).

The WWW browser receives the response from the server 10 (response reception step 1608). If the received response includes the electronic data (YES in response determination step 1609), the WWW browser stores it in the buffer (information storage step 1610), and presents it (information presentation step 1604). When the received response does not include any electronic data (NO in response determination step 1609), the WWW browser reads electronic data stored in the buffer (information read step 1611), and presents it (information presentation step 1604). With this protocol, the latest information held by the server 10 can be presented.

For information storage step 1610, if electronic data has already been stored with the same URL in the buffer, the data is replaced with the newly received electronic data.

The operation when the URL obtained in information obtaining step 1601 does not exist in the buffer (NO in step 1605) is the same as that in the above embodiments, and a description thereof will be omitted.

A method of applying, to the information presentation terminal of the present invention, the above-described If-Modified-Since header will be described as the third embodiment.

In the third embodiment, the server 10, the electronic data transmission request, and the response format are the same as those in the above-described prior art, and only the arrangement and function of an information presentation terminal 20 are different.

The arrangement of the information presentation terminal 20 is the same as that of the information presentation terminal 20 in the first embodiment shown in FIG. 1.

Groups of individual electronic data, their URLs, and their creating dates and times are recorded on a CD-ROM 107.

Figure 9:
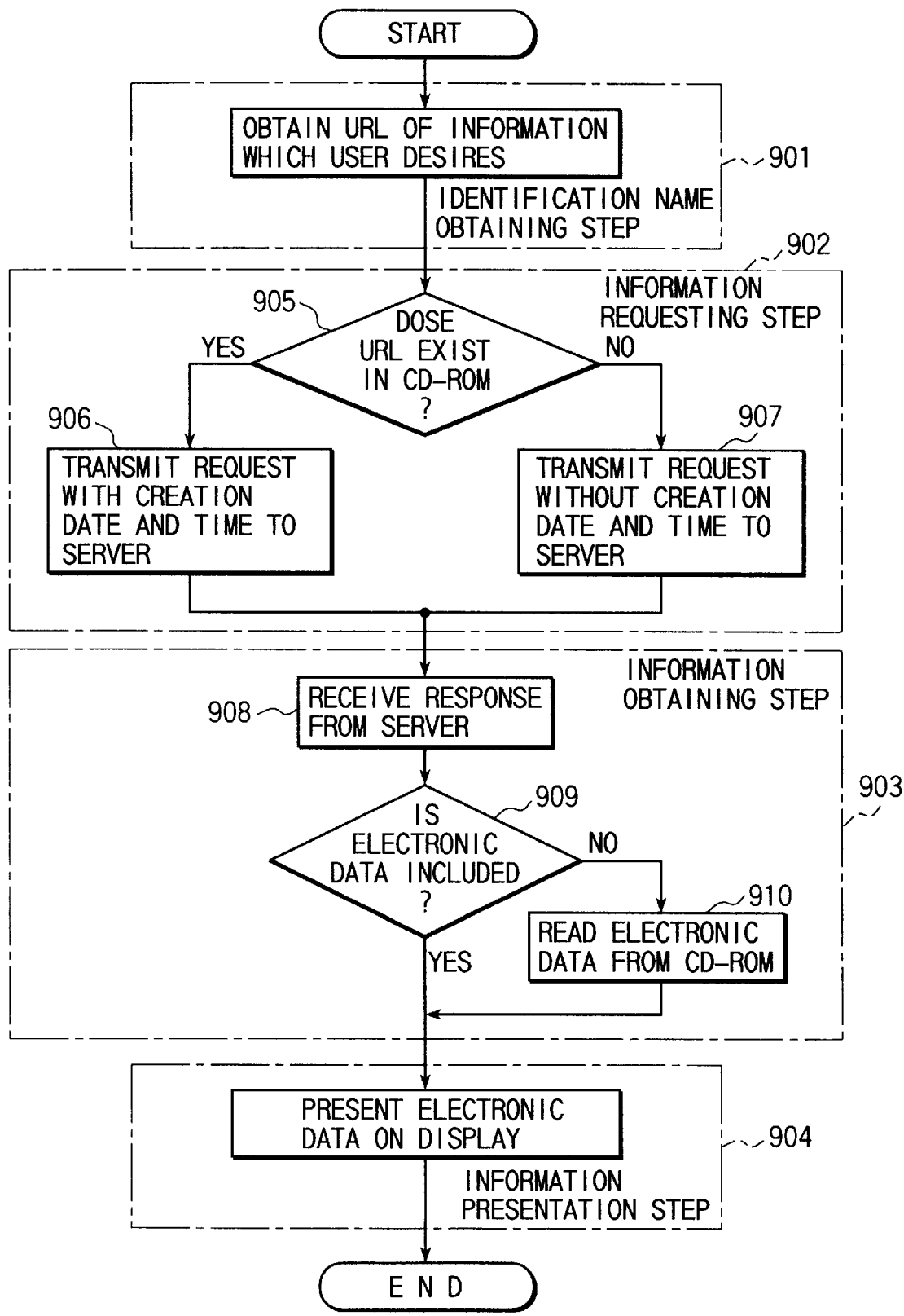
FIG. 9 is a flow chart for explaining the processing procedure of an information presentation terminal in the third embodiment of the present invention.

The main logic of the information presentation terminal 20 in the third embodiment is implemented by a program. As depicted in FIG. 9, this program is constituted by identification name obtaining step 901, information requesting step 902, information obtaining step 903, information presentation step 904, and the like.

The information obtaining step is constituted by search step 905, first request transmission step 906, second request transmission step 907, and the like.

Information obtaining step 903 is constituted by response reception step 908, response determination step 909, information read step 910, and the like.

FIG. 9 shows the relationship between the respective steps.

In information requesting step 902, search step 905 searches the CD-ROM 107 for the URL obtained in identification name obtaining step 901.

If the URL is found (YES in search step 905), the information presentation terminal 20 sends, to the server 10, a transmission request in which creating date and time recorded on the CD-ROM 107 are added to an If-Modified-Since header (first request transmission step 906).

If the URL is not found (NO in search step 905), the information presentation terminal 20 sends a transmission request without any If-Modified-Since header to the server 10 (second request transmission step 907).

As described above, the server 10 which receives the transmission request sends a response with or without electronic data to the information presentation terminal 20 in accordance with the processing procedure shown in FIG. 17.

In information obtaining step 903, the information presentation terminal 20 receives the response from the server 10 (response reception step 908). When the received response includes the electronic data (YES in response determination step 909), the information presentation terminal 20 transfers it to information presentation step 904.

When the received response does not include any electronic data (NO in response determination step 909), the information presentation terminal 20 reads electronic data recorded on the CD-ROM 107 (information read step 910), and transfers it to information presentation step 104.

As a result, the latest information held by the server 10 can be presented.

The respective electronic data recorded on the CD-ROM 107 may have different creating dates and times, or all the electronic data recorded on the CD-ROM 107 may have a common creating date and time.

(Fourth Embodiment)

It is possible to add a buffer can be added to the information presentation terminal 20 of the third embodiment, as described in the second embodiment. An example of the information presentation method of an information presentation terminal 20 in this case will be described with reference to FIG. 10.

Groups of individual electronic data, their URLs, and their creating dates and times are recorded on a CD-ROM 107.

Figure 10:
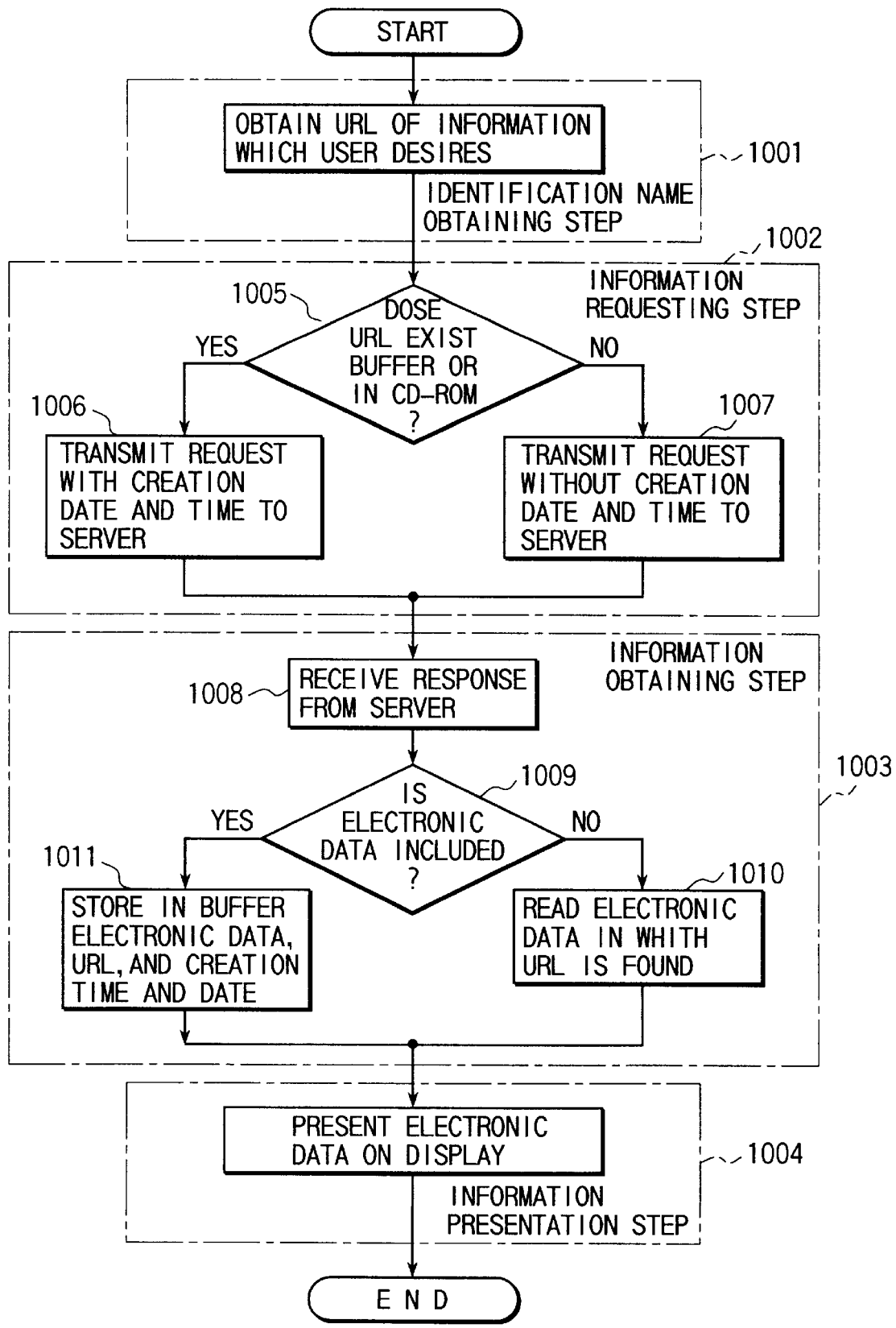
FIG. 10 is a flow chart for explaining the processing procedure of an information presentation terminal in the fourth embodiment of the present invention.

The main logic of the information presentation terminal 20 is implemented by a program. As shown in FIG. 10, this program is constituted by identification name obtaining step 1001, information requesting step 1002, information obtaining step 1003, information presentation step 1004, and the like.

Information requesting step 1002 is constituted by search step 1005, first request transmission step 1006, second request transmission step 1007, and the like.

Information obtaining step 1003 is constituted by response reception step 1008, response determination step 1009, information read step 1010, information storage step 1011, and the like. FIG. 10 shows the relationship between the respective steps.

In information requesting step 1002, search step 1005 searches the buffer and the CD-ROM 107 is searched for a URL obtained in identification name obtaining step 1001.

In the fourth embodiment, a given URL may exist in both the buffer and the CD-ROM 107. In this case, the buffer must be searched first for the URL.

If the URL is found (YES in search step 1005), the information presentation terminal 20 sends, to a server 10, a transmission request in which creating date and time recorded on the storage medium where the URL exists are added to an If-Modified-Since header (first request transmission step 1006).

If the URL is not found (NO in search step 1005), the information presentation terminal 20 sends a transmission request without any If-Modified-Since header to the server 10 (second request transmission step 1007).

As described above, the server 10 which receives the transmission request sends a response with or without electronic data to the information presentation terminal 20 in accordance with the logic shown in FIG. 17.

In information obtaining step 1003, the information presentation terminal 20 receives the response from the server 10 (response reception step 1008). When the received response includes the electronic data (YES in response determination step 1009), the information presentation terminal 20 stores, in the buffer, the electronic data, its URL, and its creating date and time which are included in the response (information storage step 1011), and transfers the electronic data to information presentation step 1004. When the received response does not include any electronic data (NO in response determination step 1009), the information presentation terminal 20 reads electronic data recorded on the storage medium where the URL is found in search step 1005 (information read step 1010), and transfers it to information presentation step 104. As a consequence, the latest information held by the server 10 can be presented.

The URL search time can be shortened by copying URLs present in the CD-ROM 107 and the buffer to a higher-speed accessible main memory or the like in advance, and searching the main memory or the like.

The above description is directed to the information presentation method in which both the CD-ROM 107 and the buffer area are used, and the latest document can be presented even when the electronic data is updated on the server side.

The case using both the CD-ROM 107 and the buffer, as in the second and fourth embodiments described above, requires buffer overflow processing when many electronic data are to be stored in the buffer.

Preferred buffer overflow processing in the fourth embodiment will be described.

Generally, conventional buffer overflow processing selects, e.g., the oldest data stored in the buffer, or least recently referred electronic data and discards the electronic data itself, its URL, and its creating date and time are deleted.

Figure 11:
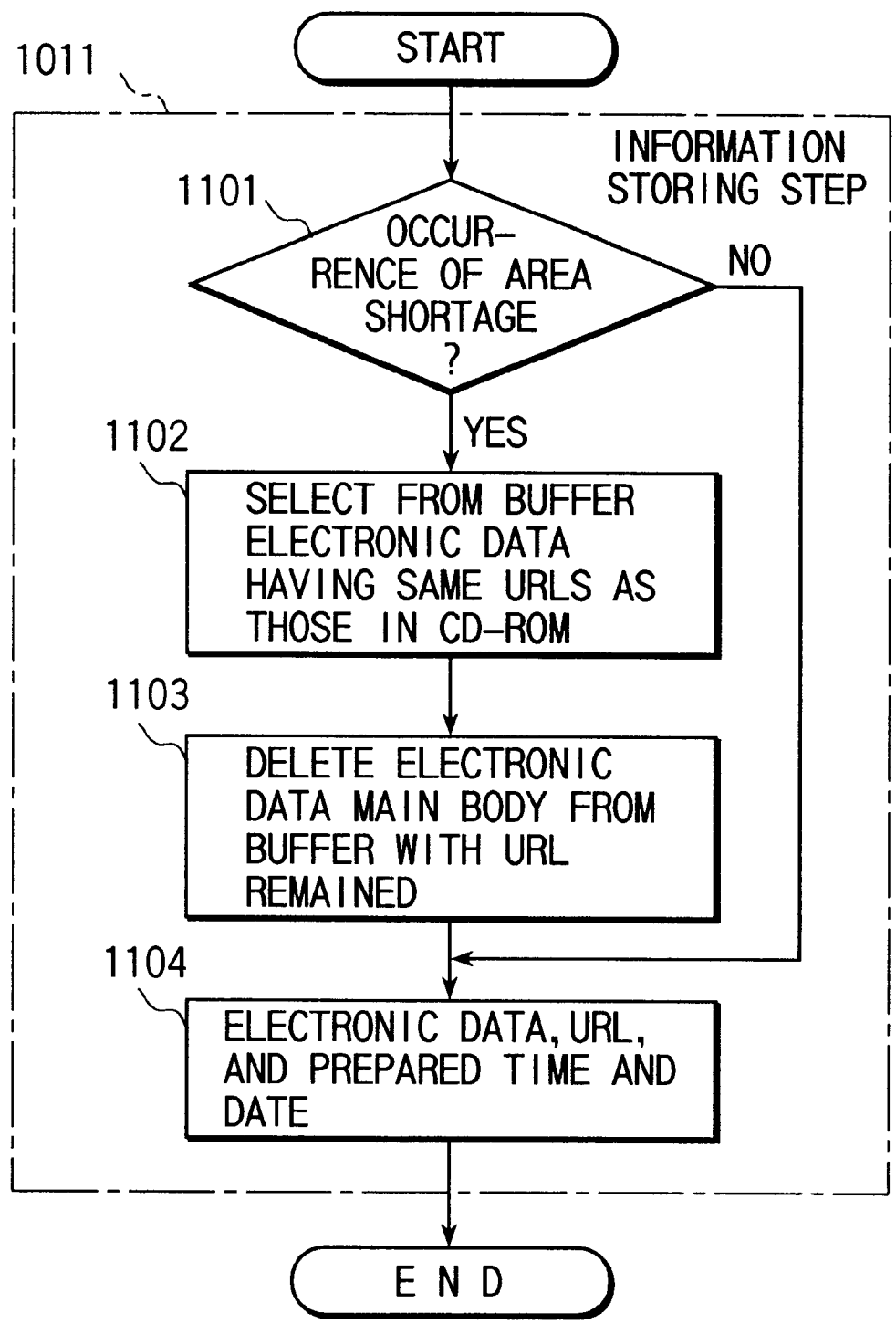
FIG. 11 is a flow chart for explaining a processing procedure according to the fourth embodiment of the present invention when a buffer area shortage occurs.

In the information presentation method of the fourth embodiment, buffer overflow processing is more desirably performed by a processing procedure shown in FIG. 11 in information storage step 1011.

The buffer overflow processing will be described on the basis of FIG. 11. When an area for storing electronic data included in a response received from the server 10 cannot be assured in the buffer (YES in step 1101), allocated electronic data having the same URLs as those in the CD-ROM 107 are selected (step 1102). The electronic data main body and their creating dates and times are deleted while the URLs are preserved (step 1103). Then, the electronic data included in the response received from the server 10, its URL, and its creating date and time are stored (step 1104).

By setting these steps, almost the same reduction effect as that when all URLs, electronic data and their creating dates and times are deleted can be obtained. In addition, the following two effects can be attained.

First, information is sometimes obtained at a higher speed. More specifically, in search step 1005 shown in FIG. 10, when the URL whose electronic data is deleted is found, the latest electronic data exist in the server 10. That is, the transmission request can be issued to the server 10 without searching the CD-ROM 107 for the URL.

Second, when the information presentation terminal is used where it is disconnected from the server. It is required that information is presented using only electronic data stored in the CD-ROM 107 and the buffer. If only a URL exists in the buffer, the electronic data in the CD-ROM 107 is determined not to be the latest.

In this case, in information obtaining step 1003, the information presentation terminal 20 reads the electronic data in the CD-ROM 107 in information reading step 1010, and transfers it with tag data representing "not the latest" to information presentation step 1004. Information presentation step 1004 can inform the user that the presented electronic data is "not the latest" by changing the text color or font or by enclosing an image by a special frame or the like.

(Fifth Embodiment)

In the information presentation terminal of the present invention, the CD-ROM 107 can be easily mounted/unmounted in/from the CD-ROM reading unit 106. When the user requests presentation of certain information, all electronic data may be transferred from the server though the user has a corresponding CD-ROM 107 if the user accidentally forgets to load the CD-ROM 107 in the CD-ROM reading unit 106.

As a preferable method of solving this problem, the server 10 holds electronic data recorded on the CD-ROM 107 together with an advisory message "please mount the CD-ROM 107 if you have one" or the like.

Consequently, if the CD-ROM 107 is mounted, no advisory message is displayed because the electronic data in the CD-ROM 107 is used. Otherwise, the electronic and the advisory message are transferred from the server and the advisory message is displayed as well.

(Sixth Embodiment)

A method in which CD-ROM 107 and the server have different versions of given electronic data and the server transfers the difference to accelerate the presentation will be described as the sixth embodiment. In this embodiment, either the conventional WWW browser or the WWW server can not be used as they are.

The present inventions assumes that the CD-ROM 107 is distributed periodically (e.g., once every half year) and electronic data on the server 10 is frequently updated. Here an old version means electronic data on the CD-ROM 107. Although the sixth embodiment assumes one old version for the sake of simplicity, this embodiment can be applied to two or more old versions.

The schematic arrangement of this embodiment is the same as that in FIG. 1. The same reference numerals as in FIG. 1 denote the same parts, and a description thereof will be omitted.

The server 10 in this embodiment will be described first.

The server 10 holds both old and new versions of electronic data together with their creating dates and times. The server 10 may hold the difference between the old and new versions, instead of the old version.

Figure 12:
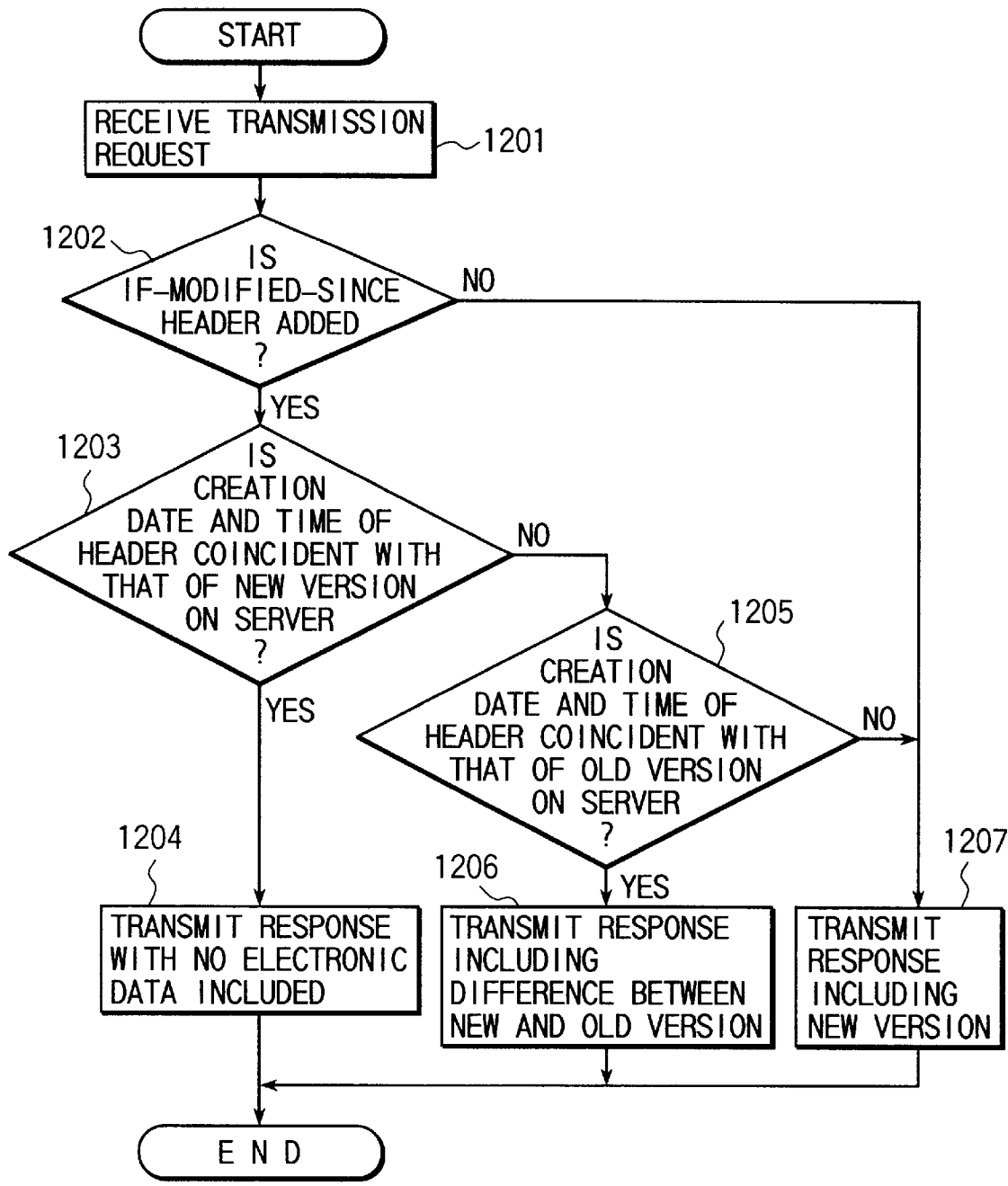
FIG. 12 is a flow chart for explaining the processing procedure of a server 10 according to the sixth embodiment of the present invention.

FIG. 12 shows the main procedure of the server 10.

When the server 10 receives a request from the information presentation terminal 20 (request reception step 1201), it checks whether an If-Modified-Since header is added (request determination step 1202). If no If-Modified-Since header is added (NO in request determination step 1202), the server 10 sends a response including electronic data of the new version (third response step 1207).

If the If-Modified-Since header is added (YES in request determination step 1202), the server 10 compares the creating date and time of the header with the creation date and time of the new version held by the server 10 (new version determination step 1203).

If the two coincide with each other (YES in new version determination step 1203), the server 10 sends a response with no electronic data included (first response step 1204).

If the two are different, the server 10 compares the prepared date and time of the If-Modified-Since header with the creation date and time of the old version held by the server 10 (old version determination step 1205).

If the two coincide with each other (YES in old version determination step 1205), the server 10 sends a response including the difference between the new and old versions (second response step 1206).

If the two do not coincide with each other, the server 10 sends a response including electronic data of the new version (third response step 1207).

The main processor of the information presentation terminal 20 will be explained below.

Figure 13:
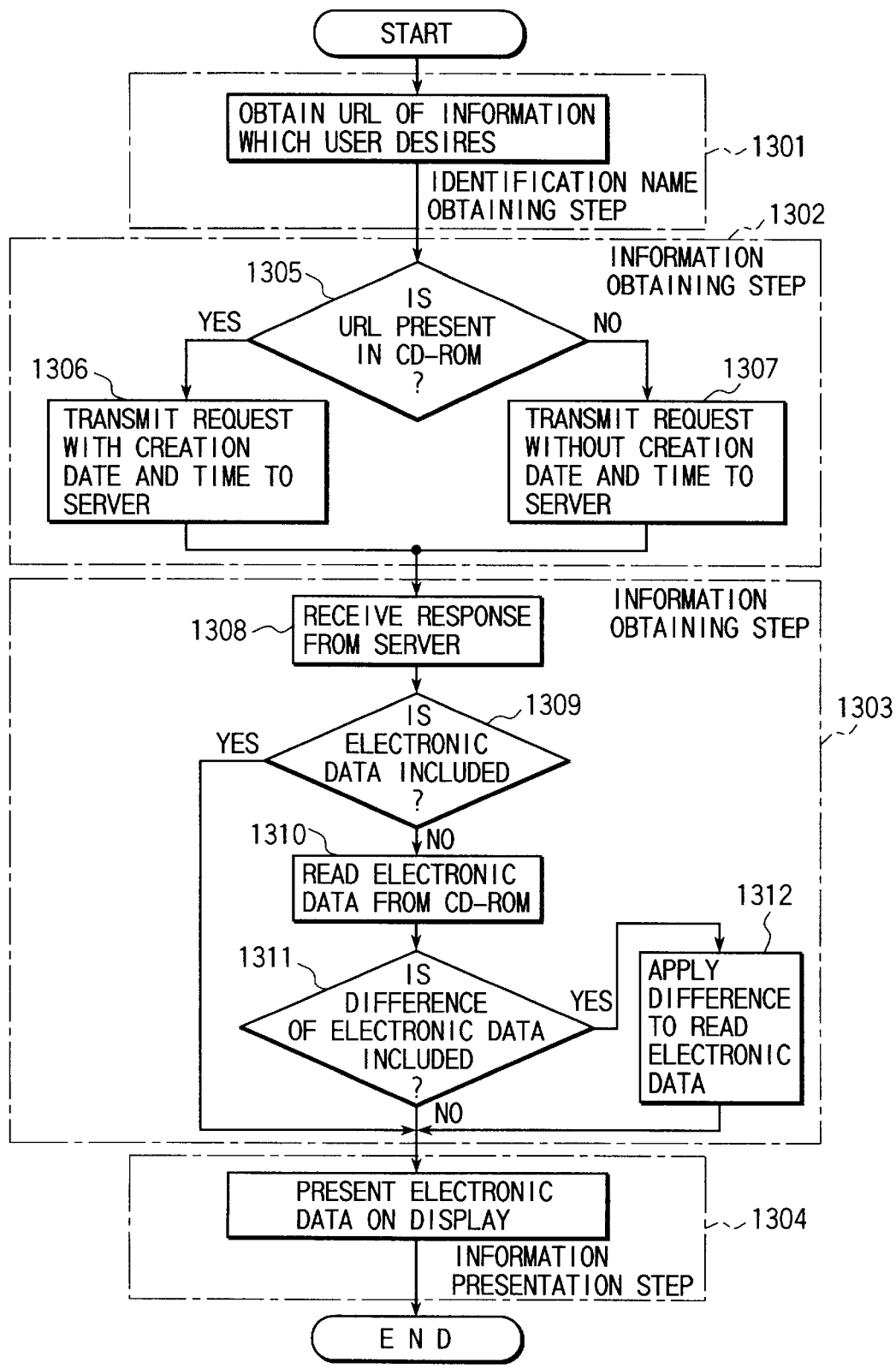
FIG. 13 is a flow chart for explaining the processing procedure of an information presentation method according to the sixth embodiment of the present invention.

The information obtaining step shown in FIG. 13 is similar to the method shown in FIG. 9. The difference is that the information obtaining step in FIG. 13 is added with the step (step 1312) of applying, when the information presentation terminal 20 receives a response including the difference between the new and the old electronic data from the server 10 (YES in step 1311), the difference to the electronic data read from the CD-ROM 107, thereby generating electronic data of the new version.

This embodiment is particularly effective for, e.g., road maps and time tables. In the case of a road map, the electronic data of the CD-ROM 107, i.e., a road map may become obsolete partially due to opening to an expressway, setting of a traffic signal, a town name change, a temporary traffic regulation, or the like.

Generally, in the case of two-dimensional information such as a road map, information on the display is expressed as a collection of small blocks. The difference between the new and the old versions is expressed by a pair of identifier of a changed block and the new contents of the block. Accordingly, the main procedures of the server 10 and the information presentation terminal 20 can be performed at a high speed.

It is sometimes more preferable to express the difference using a pair of identifier of the changed block and the difference between the new and the old versions of this block, because the data amount to be transmitted/received between the server 10 and the information presentation terminal 20 is expected to be reduced.

In the case of a time table, part of the train schedule may sometimes be updated due to setting of a special train, or the like.

The time table can be expressed as a document of the HTML format. The difference data amount to be transmitted/received between the server 10 and the information presentation terminal 20 can be reduced by applying, e.g., a means for efficiently generating a difference, such as a "diff" command in the UNIX operating system.

In the case of a multi-purpose map information system, the contents to be presented vary depending on the purpose. For example, the price of land should be displayed only in limited case while roads and railways and other landmarks should be displayed in most purposes.

To keep map information efficiently, information commonly used for the respective purposes, such as roads, railways, and town names, are stored as one file. Information used only for one purpose is stored as a separate HTML file in the server 10 or the CD-ROM 107. When the user requests presentation of a map for a specific purpose, the information presentation terminal 20 desirably integrates the common map and the information for the specific purpose in the information obtaining step to transfer the integrated information to the information presentation step.

A function of monitoring the use frequency of each user, a function of accounting for the user, and a function of collecting the rating can be incorporated.

For this purpose, the electronic data stored in the CD-ROM should have some intentionally omitted portion or include incorrect data so that the information presentation terminal can not be used without being connected to the server.

When the user connects the information presentation terminal 20 to the server 10, receives a response including the difference from the correct and the incorrect information from the server 10 and present correct on the display unit. Accordingly, the user and electronic data referred by this user can be monitored by the server 10 without spoiling the advantage of a short time required for information presentation.

As a method of generating electronic data to be stored in the CD-ROM 107, correct electronic data may be encoded, and the information presentation terminal 20 may be given the key from the server 10 to decode the encoded data in the information obtaining step.

To count the use frequency of each user, data of the use count of the user who is using the information presentation terminal 20 is updated each time the information presentation terminal 20 requests electronic data.

The monitored information helps the mail-order dealer to determine whether a next CD-ROM 107 should be distributed to the user.

When the CD-ROM 107 is used as an educational material, the learning step can be monitored on the server 10 side.

In the case of the accounting function, a charge is set for respective electronic data in advance. Each time the information presentation terminal 20 requests electronic data to the server, the charge for the electronic data is added to the accounting data of the user who is using the information presentation terminal 20. Since the use of a non-registered person can be inhibited, no problem arises even if the CD-ROM 107 is copied without any permission.

In the case of rating data collection, each time the information presentation terminal 20 requests electronic data, the reference count of the electronic data is incremented. To obtain more detailed data, for example, the reference count is divisionally incremented for each use time zone. Alternatively, the profile of the user including the age, sex, and occupation is prepared. Each time the information presentation terminal 20 requests electronic data, the reference count of the electronic data by user's age, and the like is incremented.

Since electronic data sent from the server 10 is assumed to be stored in the buffer, the difference is also stored in the buffer and in the use of electronic data next time, correct information is presented without connecting the information presentation terminal 20 to the server 10 via the network. This may pose a problem in rating collection or the like, so a method of avoiding such a situation will be described.

The methods of generating the difference in the server 10, and generating correct information in the information presentation terminal 20 are changed to generate the correct information in the information presentation terminal 20 on the basis of "the electronic data of the CD-ROM 107+the difference+request date and time sent from the server 10", instead of "the electronic data of the CD-ROM 107+the difference".

Therefore, on the day when the difference is received from the server 10, correct information can be obtained in reference from the next time without connecting the information presentation terminal 20 to the server 10. On the next day, however, correct information cannot be obtained. In this case, it is desirable to clearly inform the user that presented information is incorrect. Like the above encoding, a method in which the whole electronic data are influenced by a change in date should be employed.

The information presentation terminal 20 can present correct information only when it receives the difference from the server 10. The difference transferred from the server 10 to the information presentation terminal 20 can be a small data amount, i.e., at a higher speed than transfer of the whole electronic data.

(Seventh Embodiment)

The seventh embodiment of the present invention will be described.

This embodiment exemplifies a method of effectively using the CD-ROM 107 in the information presentation terminal 20 equipped with both the CD-ROM 107 and the buffer as in the second and fourth embodiments. The same reference numerals denote the same parts, and a description thereof will be omitted.

As an application frequently used in a WWW information presentation terminal 20, there is a program, called a search robot, in which, when information the user wants to know is given in, e.g., a combination of key words, electronic data are sequentially obtained by tracing a hyper link, thereby gathering electronic data which match the key words, or their URL. The operation of this search robot is performed without user interaction. Upon completion of the search, the user watches presentation of the gathered electronic data to get necessary information.

This embodiment will exemplify a method of obtaining electronic data of the latest version from a server 10 without the user interaction when electronic data such as a map or time table is stored in a CD-ROM 107.

Figure 14:
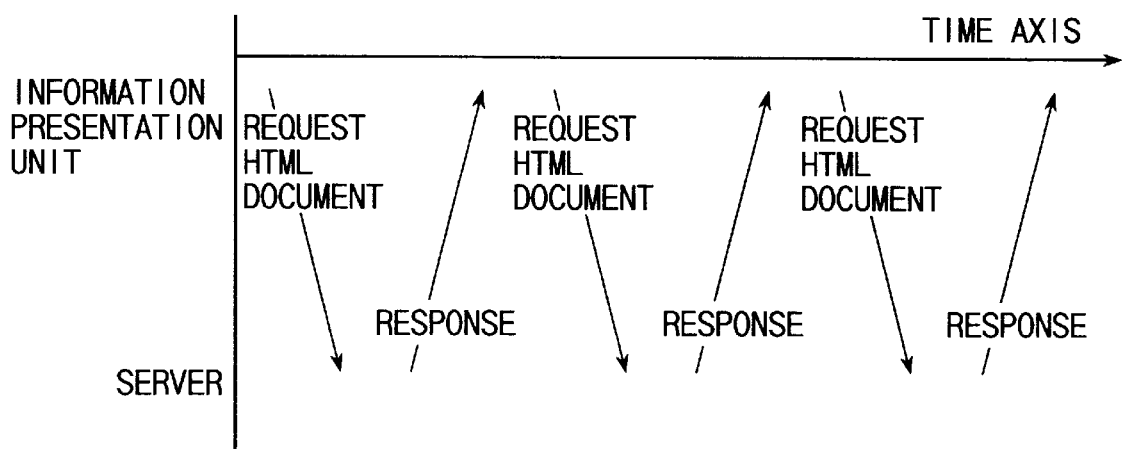
FIG. 14 is a diagram showing the first method of obtaining the electronic data difference between a CD-ROM and the server 10 according to the seventh embodiment of the present invention.

The simplest method is to request electronic data with an If-Modified-Since header of the server 10 by using the URL of electronic data stored in the CD-ROM. FIG. 14 shows an example of this operation. In this case, if the difference between the new and the old electronic data is used, the amount of the buffer area in use can be reduced, as described in the sixth embodiment.

In the above method, if, e.g., 10,000 pieces of electronic data are stored in the CD-ROM 107, that number of data requests with If-Modified-Since headers are sent to the server 10, and that number of responses are required, which poses a problem in terms of performance. A method of solving this problem in accordance with a WWW communication protocol called HTTP will be described below.

The information presentation terminal 20 sends an identification code representing the version of the CD-ROM 107 to the server 10. The server 10 checks whether electronic data included in the CD-ROM 107 having the above identification code is different from electronic data of the latest version held by the server 10, and returns a group of URLs of the electronic data.

Figure 15:
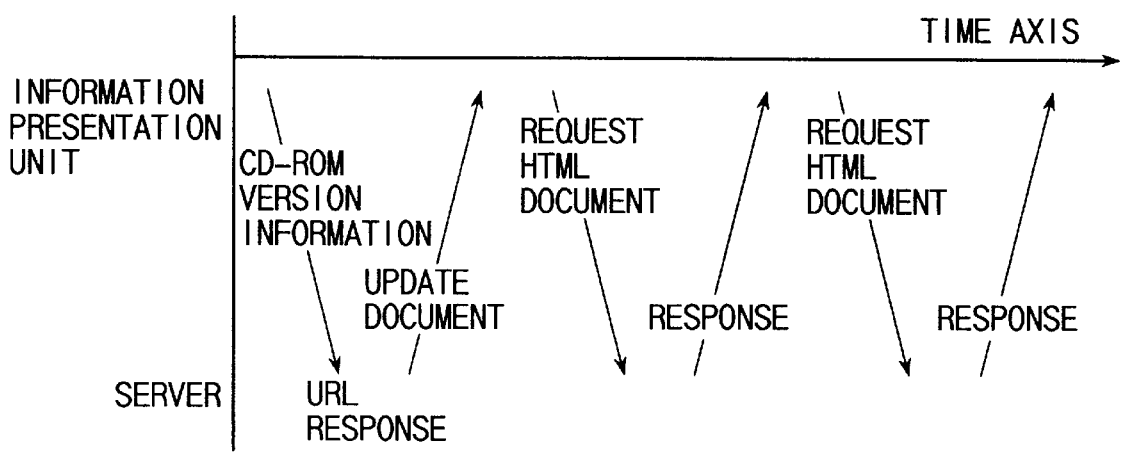
FIG. 15 is a diagram showing the second method of obtaining the electronic data difference between the CD-ROM and the server 10 according to the seventh embodiment of the present invention.

The information presentation terminal 20 sends electronic data requests to the server 10 one by one in accordance with the received URL group to obtain the latest electronic data. FIG. 15 shows an example of this operation.

As advantages of this method, first, the number of messages between the information presentation terminal 20 and the server 10 can be suppressed to nearly the number of updated electronic data.

Second, the server 10 can send a group of URLs of electronic data desired to be received by the information presentation terminal 20 on the basis of the identification code of the CD-ROM 107. It is possible for the server to send URLs which are not included in the CD-ROM 107.

Generally in the server 10, pieces of electronic data and their associated URLs are created or removed as well as being modified. The second advantage is considerable in some cases.

When the above processing is periodically executed, if previously updated electronic data remains in the buffer, and its creation date and time coincide with those of electronic data stored in the server 10, this electronic data need not be received again from the server 10. In this case, the following method is useful.

The information presentation terminal 20 sends an identification code representing the version of the CD-ROM 107 to the server 10. The server 10 checks whether electronic data included in the CD-ROM 107 having the above identification code is different from electronic data of the latest version held by the server 10, and returns a group of pairs of URLs of the electronic data, and their creation dates and times in the server 10.

If, of the received URLs, a given URL is stored in the buffer, and its creation date and time on the buffer coincide with the creation date and time sent from the server 10, the information presentation terminal 20 does not send any electronic data request to the server 10.

For the remaining electronic data, the information presentation terminal 20 requests the latest electronic data of the server.

This method is effective because the status of each information presentation terminal 20 need not be managed in detail on the server 10 side.

Additional advantages and modifications will readily occur to those skilled in the art Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An information presentation terminal which is connected via communication means to a server storing electronic data and having a function for, upon reception of a transmission request including an identification name and a date and time for specifying electronic data, comparing the date and time included in the transmission request with a prepare data and time of electronic data corresponding to the identification name stored in said server, when the date and time included in the transmission request are older, sending a response including a difference between the electronic data designated by the date and time and latest electronic data, said terminal comprising:

a large-capacity storage medium in which the electronic data stored in said server and an identification name are permanently stored;

a second storage medium from/in which the electronic data and the identification name can be read/rewritten;

identification name obtaining means for obtaining an identification name of electronic data to be presented;

information requesting means for, when the identification name obtained by the identification name obtaining means exists in said large-capacity storage medium or the second storage medium, sending a transmission request including the identification name and the prepared date and time to said server;

information obtaining means for
reading electronic data corresponding to the identification name from said large-capacity storage medium or the second storage medium; and
applying the difference to the electronic data to obtain the latest electronic data when a response corresponding to the transmission request is received from said server, and the difference of the electronic data is included in the response; and information presentation means for presenting the electronic data obtained by said information obtaining means.

2. A terminal according to claim 1, wherein electronic data having spatial information such as a map is expressed as a group of electronic data associated with small blocks constituting the electronic data; and
the difference between the electronic data designated by the date and time and the latest electronic data is expressed as a group of latest electronic data associated with small blocks having a difference.

3. A terminal according to claim 1, wherein electronic data having spatial information such as a map is expressed as a group of electronic data associated with small blocks constituting the electronic data; and
the difference between the electronic data designated by the date and time and the latest electronic data is expressed as a group of differences between the electronic data designated by the date and time and latest electronic data which are associated with small blocks having a difference.

4. An information presentation system comprising a server storing electronic data, and an information presentation terminal for presenting the electronic data stored in said server, said server and said information presentation terminal being connected via communication means;
said server having means for, upon reception of a transmission request including an identification name and a date and time for specifying electronic data, comparing the date and time included in the transmission request with a prepared date and time of electronic data corresponding to the identification name stored in said server, when the date and time included in the transmission request are older, sending a response including a difference between the electronic data designated by the date and time and latest electronic data, and
said information presentation terminal having a large-capacity storage medium in which the electronic data stored in said server and an identification name are permanently stored;
a second storage medium from/in which the electronic data and the identification name can be read/written;
identification name obtaining means for obtaining an identification name of electronic data to be presented;
information requesting means for, when the identification name obtained by the identification name obtaining means exists in said large-capacity storage medium or the second storage medium, sending a transmission request including the identification name and the prepared date and time to said server;
information obtaining means for
reading electronic data corresponding to the identification name from said large-capacity storage medium or the second storage medium, and
applying the difference to the electronic data to obtain the latest electronic data when a response corresponding to the transmission request is received from said server, and the difference of the electronic data is included in the response; and information presentation means for presenting the electronic data obtained by said information obtaining means.

5. The system according to claim 4, wherein said server stores use purpose information prepared for respective use purposes, and has a function of, upon reception of a transmission request including an identification name for specifying use purpose information, sending a response including the use purpose information corresponding to an identification name, and
said large-capacity storage medium stores common information commonly used for the respective use purposes, and
said information presentation terminal further comprises:
identification name obtaining means for obtaining an identification name of use purpose information to be presented;
information requesting means for sending a transmission request including the identification name obtained by said identification name obtaining means to said server;
information obtaining means for receiving, from said server, a response corresponding to the transmission request, and synthesizing use purpose information included in the response with the common information on said large-capacity storage medium; and
information presentation means for presenting electronic data obtained by said information obtaining means.

6. A system according to claim 4, wherein said server holds, as the same identification name, electronic data prepared by adding a message prompting loading of said large-capacity storage medium to electronic data stored in said large-capacity storage medium.

7. A system according to claim 5, wherein said server has a function of collecting a use frequency of each electronic data every time the transmission request is sent from said information presentation terminal.

8. A system according to claim 5, wherein said server has a function of collecting use frequencies of each user of said information presentation terminal and each electronic data every time the transmission request is sent from said information presentation terminal.

9. A system according to claim 5, wherein said server has a function of charging a use fee to each user of said information presentation terminal every time the transmission request is sent from said information presentation terminal.

10. A method of obtaining electronic data corresponding to a given identification name which is usable in an information processing unit that is connected via communication means to a server storing electronic data and having a function of, upon reception of a transmission request including an identification name for specifying electronic data, sending a response including electronic data corresponding to the identification name, and a function of, upon reception of a transmission request including an identification name and a date and time for specifying electronic data, sending a response including a difference between the electronic data designated by the date and time and latest electronic data, or the latest electronic data itself, and has a large-capacity storage medium in which the electronic data stored in said server, an identification name, and a prepared date and time are stored, and has a second storage medium from/in which the electronic data and the identification name can be read/written, the method comprising the steps of:

searching said large-capacity storage medium and said second storage medium for the identification name;

sending, to said server, a transmission request including the identification name and a prepared date and time when the identification name is determined in the search step to exist in said large-capacity storage medium or said second storage medium;

sending a transmission request including the identification name to said server when the identification name is determined in the search step not to exist in said large-capacity storage medium and said second storage medium;

receiving a response from said server corresponding to the transmission request;

determining whether the received response includes a difference of the electronic data corresponding to the identification name, or latest electronic data itself; and reading the electronic data corresponding to the identification name from said large-capacity storage medium or said second storage medium when the received response is determined in the response determination step to include the difference of the electronic data corresponding to the identification name.

11. A method according to claim 10, further comprising the information requesting step of, as for electronic information included in said large-capacity storage medium or said second storage medium, sending a transmission request including an identification name to said server, and wherein the information requesting step is executed on demand periodically or based on a user's request.

12. A method according to claim 10, further comprising the steps of:

expression said electronic data having spatial information such as a map as a group of electronic data associated with small blocks constituting the electronic data; and expressing the difference between the electronic data designated by the date and time and the latest electronic small blocks having a difference.

13. A method according to claim 10, further comprising the steps of:

expressing said electronic data having spatial information such as a map as a group of electronic data associated with small blocks constituting the electronic data; and expressing the difference between the electronic data designated by the date and time and the latest electronic data as a group of differences between the electronic data designated by the date and time and latest electronic data which are associated with small blocks having a difference.

\* \* \* \* \*

UNITED STATES PATENT AND TRADEMARK OFFICE
CERTIFICATE OF CORRECTION

PATENT NO.    : 6,076,103
DATED         : June 13, 2000
INVENTOR(S)   : Hiroshi SAKAI It is certified that error appears in the above-identified patent and that said Letters Patent is hereby corrected as shown below:

Claim 1, col. 18, line 53, "prepare data" should read --prepared data--.

Claim 12, col. 22, line 10, "expression" should read --expressing--.

Signed and Sealed this

Twenty-second Day of May, 2001

Attest:

NICHOLAS P. GODICI

Attesting Officer      Acting Director of the United States Patent and Trademark Office